United States Patent [19]

Solt

[11] 4,118,074
[45] Oct. 3, 1978

[54] PULSED AIR ACTIVATED CONVEYOR AND SYSTEM

[75] Inventor: Paul E. Solt, Allentown, Pa.

[73] Assignee: Fuller Company, Catasauqua, Pa.

[21] Appl. No.: 667,070

[22] Filed: Mar. 15, 1976

Related U.S. Application Data

[63] Continuation-in-part of Ser. No. 511,410, Oct. 2, 1974, abandoned.

[51] Int. Cl.² ............................................. B65G 53/18
[52] U.S. Cl. ..................................... 302/26; 302/29; 302/53
[58] Field of Search ...................... 302/26, 29, 31, 45, 302/52, 53

[56] References Cited

U.S. PATENT DOCUMENTS

| | | | |
|---|---|---|---|
| 2,527,455 | 10/1950 | Schemm | 302/29 |
| 2,805,896 | 9/1957 | Yellott | 302/29 |
| 2,844,361 | 7/1958 | Dilcher et al. | 259/1 |
| 3,016,066 | 1/1962 | Warren | 137/836 |
| 3,357,441 | 12/1967 | Adams | 137/831 |
| 3,373,760 | 3/1968 | Adams et al. | 91/3 |
| 3,403,941 | 10/1968 | Solt | 302/42 |
| 3,469,888 | 9/1969 | Aller et al. | 302/52 |
| 3,519,310 | 7/1970 | Holm et al. | 302/29 |
| 3,822,919 | 7/1974 | Strom | 302/52 |
| 3,861,753 | 1/1975 | Lesk et al. | 302/52 |

*Primary Examiner*—Evon C. Blunk
*Assistant Examiner*—Jeffrey V. Nase
*Attorney, Agent, or Firm*—Frank H. Thomson

[57] ABSTRACT

A conveyor system for solid bulk materials such as cement, alumina, and rock which combines the principles of a fluidizing gravity conveyor and a vibratory conveyor wherein the air supplied to the plenum chamber of the conveyor is rapidly and continuously pulsed in an on-off manner. The apparatus may take the form of a conveyor section with a pair of plenum chambers and the fluidizing gas alternately supplied to the two plenum chambers, or the invention may be used in a storage and material discharge vessel wherein a pair of conventional fluidizing gravity conveyors are employed along the length of the vessel with the pulsing taking place by alternating the supply of gas between the two conveyors.

5 Claims, 10 Drawing Figures

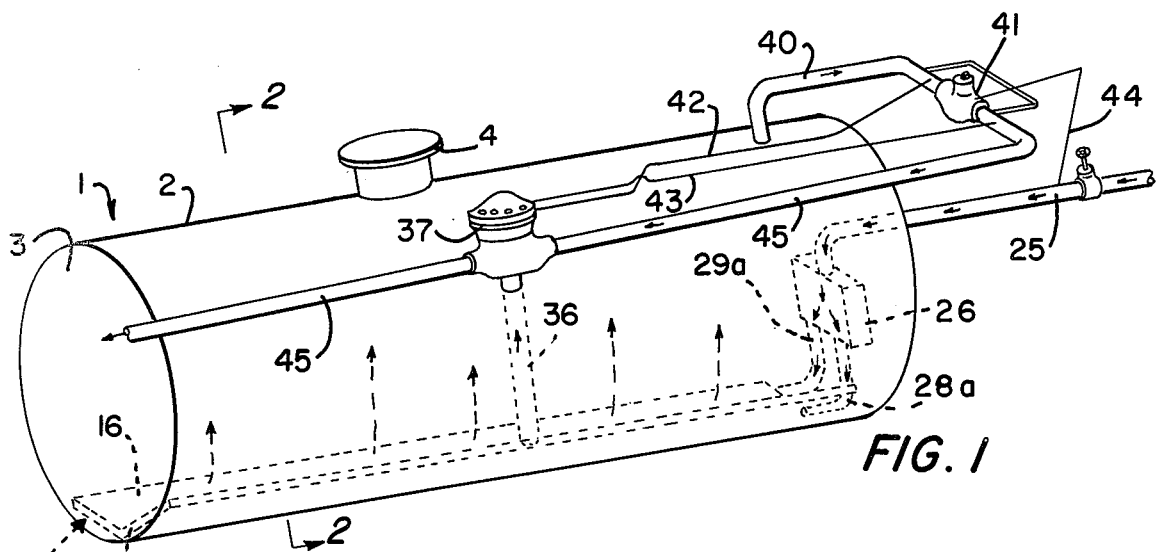
FIG. 1
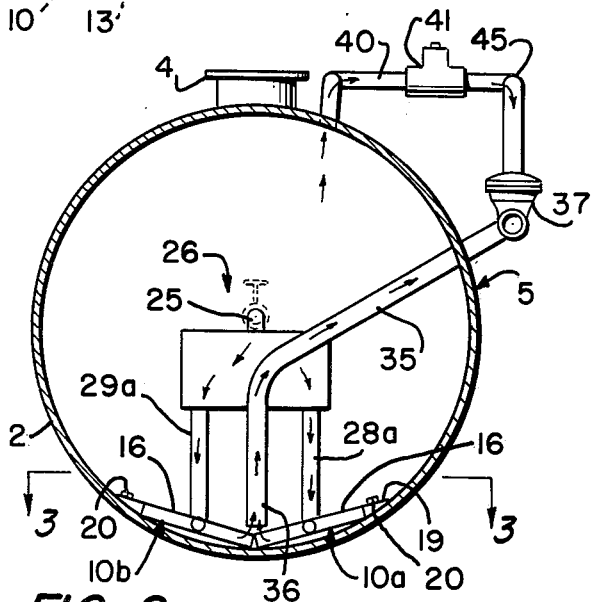
FIG. 2
FIG. 4
FIG. 3
FIG. 5
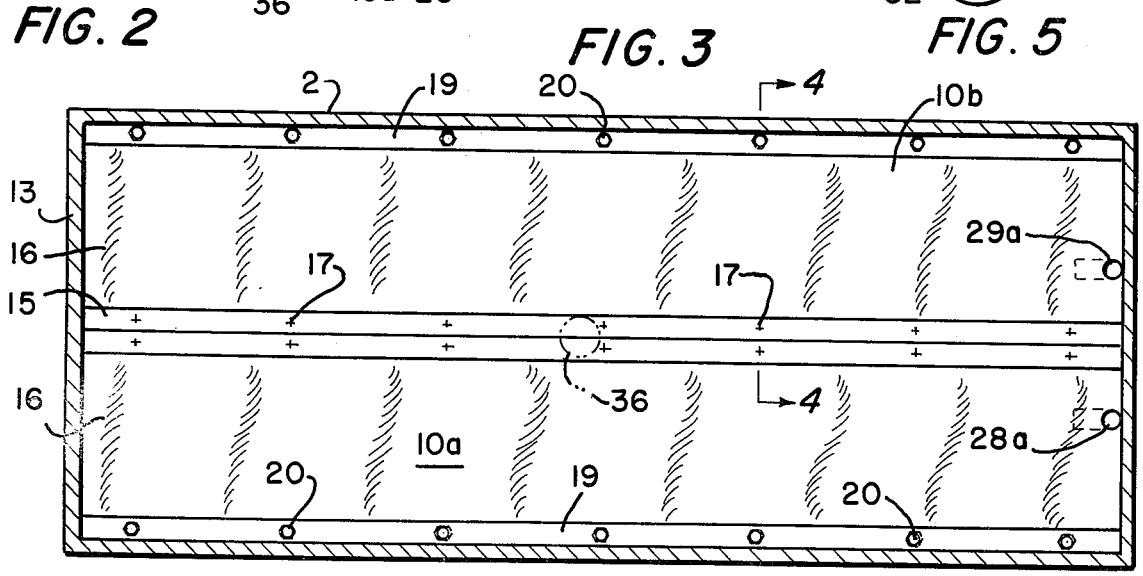

PULSED AIR ACTIVATED CONVEYOR AND SYSTEM

This application is a Continuation-in-part of copending U.S. Patent Application Ser. No. 511,410, filed Oct. 2, 1974 now abandoned.

BACKGROUND OF THE INVENTION

The present invention relates to a novel arrangement for transporting solid bulk materials and a vessel for storing and discharging such materials.

Prior to the present invention it was known to employ fluidizing gravity conveyors for transporting solid particulate material. Fluidizing gravity conveyors are generally illustrated in U.S. Pat. No. 2,527,455. Such apparatus includes a channel member having gas impervious bottom, side walls and end walls. A gas permeable material such as fabric closes the top of the channel. A closed material chamber may be provided above the fabric.

The apparatus is mounted at an incline. Air under pressure is supplied to the plenum chamber defined by the channel for passage through the gas permeable fabric to aerate the material in the material chamber. This causes the solid particulate material to act as a liquid. Solid particulate material to be conveyed moves down the inclined apparatus, along the gas permeable material through the upper channel by means of gravity.

Fluidizing gravity conveyors are well suited to conveying certain types of finely divided material, but are not well suited to other solid bulk material. As referred to in the present application, solid bulk material is intended to include finely divided solid material such as cement clinker and alumina which are normally considered as readily fluidizable and less finely divided materials such as stone, beans and the like which are not easily fluidizable, particularly when considering the air velocities normally associated with a fluidizing gravity conveyor. Fluidized gravity conveyors have not been well suited to transporting large particles of material such as stones and beans. A further disadvantage with fluidized gravity conveyors is that with certain materials the angle at which the conveyor must be set in order to convey material is often larger than one might desire. This is particularly true when head room in a plant location is minimal.

In storage vessels for bulk materials, fluidizing gravity conveyors without closed material chambers above the gas permeable fabric are used for aerating material in the vessel in order to permit the material to flow freely toward the outlet of the vessel. Conventionally, these conveyors are sloped from the end of the vessel toward a sump and the vessel outlet is located at the sump.

Also known prior to the present invention was the use of a pneumatic diverting valve for the purpose of pulsing the air supplied to a fluidizing gravity conveyor to assist in the conveying of materials. A prior U.S. Patent showing such an arrangement is U.S. Pat. No. 3,469,888 issued Sept. 30, 1969. The inventor of the present application is a co-inventor of that patent. In that patent, a railway car or other vessel is divided into a material chamber and a plenum chamber by a sloping, air permeable, flexible fabric divider with the fabric being at a substantial slope toward the vessel outlet. There are two plenum chambers and an oscillating valve operating at a frequency of about 2 to 20 cycles per minute and a preferred frequency of 5 to 6 cycles per minute alternates air flow between the two plenum chambers. The intended purpose of the cycling is to produce high velocity shock waves which serve to break up compacted material above one of the plenum chambers. Once the compacted material is broken up, the air which is steadily supplied to one of the plenum chambers between cycles will fluidize material above that plenum chamber for a certain period of time, say 12 seconds if a frequency of 5 cycles per minute is used. So long as air is supplied to the plenum chamber, the material is fluidized. Once the material is fluidized, it will flow down the sloped fabric to the material outlet in a manner well known in fluidizing gravity conveyors. The oscillating valve of the above prior patent will then rapidly switch the air supply to the other plenum chamber producing a shock wave to break up compacted material and continue the air supply to that plenum chamber for the selected time period so that material above that plenum chamber is fluidized and conveyed to the vessel outlet. Since there is a substantial time span during which no air is supplied to the first plenum chamber, material above that first plenum chamber will become deaerated and stop flowing. As a result, there is not total increase in the capacity of material discharged from the vessel but only an improved ability to remove material from the vessel. The apparatus is primarily of value for discharging difficult to fluidize material from a vessel. As is apparent from U.S. Pat. No. 3,469,888, the need for complex "slope sheets" and "crickets" within the material chamber to increase material flow has not been eliminated by the patent.

Sloping the conveyors within a vessel for pulverulent material has the significant disadvantage that a substantial portion of the vessel must be taken up by the sloped conveyors, and the accompanying slope sheets and crickets. The greater the slope of the conveyors, the less space available in the vessel. In addition, this complex arrangement substantially increases the manufacturing cost of the vessel. Even with the large slope angle of the conveyors or aeration units and the use of slope sheets and crickets, these vessels are not usable for all bulk materials. Prior to the present invention it was known to combine a fluidizing gravity conveyor with means for vibrating the gas permeable member dividing the plenum chamber and the material chamber. A prior system for doing this is shown in British Specification No. 712,593 published July 28, 1954 which shows an electro magnetic arrangement for vibrating the gas permeable member. A similar arrangement is shown in U.S. Pat. No. 3,519,310 except that a Sonic generator (horn) is used instead of a vibrator directly attached to the fabric. These arrangements have the disadvantage of requiring some means in addition to the steady fluidizing air to achieve the desired vibration. A sonic generator can create a noise problem of a type not normally associated with the type of equipment referred to by the present invention and usually undesirable. The use of an electro magnetic vibrator necessitates the use of electric wiring in a dusty application which is usually undesirable.

Other apparatus for pulsing air supplied to the plenum chamber of a fluidizing gravity conveyor type apparatus were also known prior to the present invention. One such apparatus is shown in U.S. Pat. No. 2,844,361 which relates to a blending apparatus and uses pulses of supplemental air to break up open areas in the material. In that patent, a mechanical means is used for pulsing which inherently limits the frequency of pulsing obtainable. It is not believed that sufficiently rapid pulsing of the air can be achieved to increase conveying capacity. In addition, the material is continuously aerated by one source of air and pulsed by air supplied by a second source. The fact that there are two sources of air insure that the material will not become deaerated between pulses but obviously does not reduce the use of compressed air.

The use of lobed rotor blowers as a means for supplying air to fluidizing gravity conveyors is a common practice. These blowers inherently rapidly pulse the air supplied to the plenum chamber. The pulses will occur at the rate of four times the speed of the blower which may result in a total of 1,000 pulses per minute and more. This pulsing is not an on-off type of pulse. There is no noticeable difference in conveying capacity between steady state air supply and air supplied by a lobed rotor blower.

Thus, prior apparatus which pulsed air supplied to the plenum chamber of a fluidizing gravity conveyor or vibrated the fabric usually required additional apparatus to achieve the vibration or pulsing and even where additional apparatus was not required, increased capacity was not achieved.

SUMMARY

It is therefore the principal object of this invention to provide a novel apparatus for transporting solid bulk materials which will permit a substantial reduction in the slope of the conveyor.

It is a further object of this invention to provide an apparatus for transporting solid bulk material which employs the principle of fluidization of the material and permits a reduction in the air volume requirements of the conveyor.

It is a still further object of this invention to provide a storage vessel for storing and discharging solid bulk material which will substantially increase the amount of material which may be withdrawn from a given size vessel.

In general the foregoing and other objects will be carried out by an apparatus for transporting solid bulk material comprising: means defining an open topped plenum chamber; gas permeable means closing the open top of said plenum chamber for supporting material to be transported; means for supplying gaseous fluid at superatmospheric pressure to said plenum chamber including means for rapidly and continuously pulsing the supply of gaseous fluid to said plenum chamber at a frequency of at least about one cycle per second whereby the gaseous fluid passes through the gas permeable means and the bulk material is transported along the gas permeable means.

BRIEF DESCRIPTION OF THE DRAWINGS

The invention will be described in connection with the annexed drawings wherein:

FIG. 1 is a perspective view of a vessel employing the novel conveying system of the present invention;

FIG. 2 is a sectional view taken on the line 2—2 of FIG. 1;

FIG. 3 is a plan view of the conveyor units of the vessel of FIG. 1 and is taken on the line 3—3 of FIG. 2;

FIG. 4 is a sectional view of a conveyor unit and taken on the line 4—4 of FIG. 3;

FIG. 5 is a diagrammatic view of the diverting valve employed by the present invention;

DESCRIPTION OF THE PREFERRED EMBODIMENT

Figure 6:
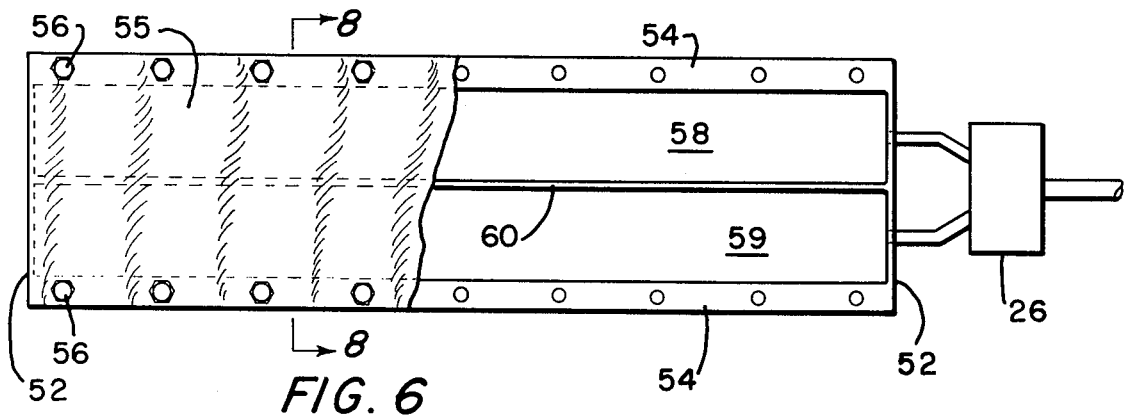
FIG. 6 is a plan view of an individual conveyor section in accordance with the present invention.

Referring to the drawing, there is shown in FIG. 1 a vessel generally indicated at 1 for storing and discharging solid bulk material. The vessel 1 is in the form of an elongated cylindrical member 2 having end walls 3 closing the vessel, an inlet 4 for material and an outlet generally indicated at 5 for bulk material to be discharged. Inside the vessel along the bottom thereof, there is placed a pair of aeration units or fluidizing gravity conveyor generally designated as 10 and shown in section in FIG. 4. These aeration units include a channel member having a gas impervious bottom 11, side walls 12 and end walls 13 which define an open top plenum chamber 14. The channel 10 may include flanges 15 on side walls 12. A gas permeable member 16 such as fabric closes the open top of the plenum chamber 14 and is secured to the flanges 15 by suitable means such as fasteners 17.

With the present invention, the aeration units 10 may be laid in the bottom of the vessel 1. In the embodiment shown, two aeration units 10a and 10b will, because of the shape of the vessel 1, form a V shape along the bottom of the container. The aeration units 10 extend along the length of the vessel 1 substantially parallel to the walls of the vessel. In order to make a smooth transition from the top of the aeration unit 10 to the side of the vessel 1, flat plate members 19 may extend from the outer edge of each aeration unit to the wall 2 of the vessel 1. Suitable fasteners 20 may secure this plate to the vessel and conveyor aeration units.

As clearly shown in FIGS. 1 to 3, the aeration units do not slope from the ends of the vessel down toward the outlet 5. For many applications such a slope is not required. With the present invention, adequate clean-out is achieved without such a slope.

Gaseous fluid such as air at superatmospheric pressure is supplied from a source (not shown) through a conduit 25 to a diverting valve 26 and from the diverting valve into plenum chambers 14 of the aeration units 10. The diverting valve 26 is best shown in FIG. 5 and is a means for rapidly and continuously pulsing the supply of gaseous fluid to each plenum chamber 14 by alternating the supply of gaseous fluid first to one of the plenum chambers 14 and then to the other plenum chamber 14.

Referring to FIG. 5, the diverting valve is known per se. Basically, the valve is structurally similar to that shown in U.S. Pat. No. 3,357,441, but includes the blunt front of U.S. Pat. No. 3,373,760, and the self-oscillating feature of U.S. Pat. No. 3,016,066. The valve includes a fluid control chamber 27 having diverging sidewalls 27a and 27b, a gaseous fluid supply connection 25 at one end and a pair of gaseous fluid delivery connections 28 and 29 at the other end. The fluid control chamber 27 also includes a pair of control ports 30 and 31 and a conduit 32 connecting the two control ports 30 and 31 externally of the fluid control chamber 27. As is known from the above referenced patents, gaseous fluid entering the chamber 27 from supply conduit 25 will adhere to one of the sidewalls 27a or 27b of the chamber 27 and be directed to one of the outlet ports 28 or 29. This will produce a higher pressure in one of the control ports 30 or 31 which higher pressure will be transmitted through conduit 32 to the other control port which will shift the flow of air to the other wall 27a or 27b of the chamber 27 and hence the other outlet port 28 or 29. The port 28, is connected by means of a conduit 28a to aeration unit 10a and the port 29 is connected by means of a conduit 29a to the other aeration unit 10b.

Operation of the diverting valve can best be described by way of example. As fluid under pressure is supplied to the control chamber 27, it will flow along one of the walls 27a or 27b. Assuming it is wall 27a to begin operation, the flow along wall 27a will be diverted to outlet port 28. From outlet 28, the fluid will flow through conduit 28a to aeration unit or conveyor 10a. As fluid flows along wall 27a, the pressure in control port 30 will be higher than the pressure in control port 31. The higher pressure in port 30 will be transmitted through external conduit 32 to port 31. The increase in pressure in port 31 will force the gas flow away from wall 27a and consequently away from port 28, conduit 28a and conveyor 10a toward wall 27b. Wall 27b will divert the gas flow to outlet 29 and consequently 29a and conveyor 10b. As fluid flows along wall 27b, the pressure in control port 31 will be higher than the pressure in control port 30. The higher pressure in port 31 will be transmitted through conduit 32 to port 30. This increased pressure in port 30 will switch the flow back to wall 27a and hence aeration unit 10a. The frequency of the pulsing depends on the time it takes to transmit the pressure differential between control ports 30 and 31 and hence on the length of the conduit 32.

By the present invention, it has been found that in order to substantially increase the conveying ability of a fluidizing gravity conveyor it is desirable to rapidly and continuously alternate the supply of gaseous fluid between the two aeration units. It has been found that a frequency of at least about 1 cycle per second is needed and between about 2 and 15 cycles per second is optimum for many materials, but as much as 50 cycles per second (3000 cycles per minute) can be produced using the valve 26 and it is believed that such an increased frequency will increase conveying capacity.

The gas which is supplied to the plenum chamber 14 of the aeration units 10 flows through the gas permeable fabric 16 to aerate the material in the vessel 1. The pulsing of the gas is believed to vibrate the material in the vessel.

Referring again to FIGS. 1 and 2, the outlet 5 includes a conduit 35 having its inlet 36 adjacent the aeration units 10 and extending upwardly through the vessel walls 2 to a control valve 37. The control valve 37 may be as shown in U.S. Pat. No. 3,403,941. Material is conveyed through conduit 35 to an entrainment chamber in valve 37 by an air lift effect well known in the pneumatic conveying art. Spent fluidizing air is exhausted through the vessel 1 through a conduit 40, past a restriction 41 to the valve 37 for entraining bulk material contained in the vessel 1 and conveying it through line 45 to a use point. As explained in the U.S. patent relative to the control valve 37, suitable control conduits 42, 43 and 44 are provided for controlling the entrainment of material to be conveyed through the conduit 45. As material is withdrawn from the immediate vicinity of the inlet 36 of outlet 5, the combination of the aeration and vibration of the material causes the material to the vessel to flow along the fabric 16 toward the outlet 5.

With the present invention it has been found that a substantially greater amount of material can be removed from a conventional size vessel. This is because more efficient clean-out is possible by rapidly and continuously pulsing the air supplied to the aeration units and by the ability to have more useful space in a given size container. With one size tank, using the prior techniques of fluidizing the material in the tank, 1700 lbs of a material could be withdrawn from the vessel. Using the present invention as shown in FIG. 1, 4200 lbs of material were removed from the tank. There was substantially no residue in the bottom of the vessel 1. The present invention permits the use of a simple rolled shell for a vessel and does not necessitate the use of a complex design for the bottom of the vessel.

Figure 7:
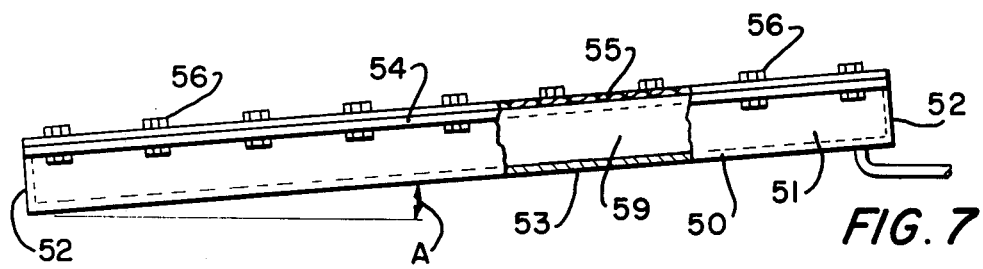
FIG. 7 is an elevation, partly in section, of the conveyor of FIG. 6.
Figure 8:
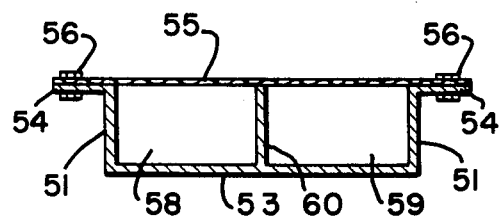
FIG. 8 is a sectional view of the conveyor of FIG. 6 and taken on the line 8—8 of FIG. 6.

The present invention may also be used as a novel conveying apparatus. Such apparatus is shown in FIGS. 6, 7 and 8. In this arrangement, a conventional fluidized gravity conveyor has its plenum chamber divided into two sections and the fluidizing air is rapidly and continuously alternated between the two plenum chambers. Referring to FIGS. 6, 7 and 8, there is shown a channel 50 defined by gas impervious side walls 51, end walls 52, and a bottom 53. As in FIG. 4, the side walls 51 may include a flange 54. A gas permeable material such as flexible fabric 55 closes the open top of the channel 50 and is secured to the flanges 54 by means of fasteners 56. The channel is divided into a pair of contiguous plenum chambers 58 and 59 by means of a wall means 60 which extends parallel to side walls 51 and from the bottom 53 to the gas permeable means 55. Although not illustrated, a closed material chamber may be secured to the channel 50 above the gas permeable member 55 as is well known in the art. The diverting valve 26 is connected to a source of pressure not shown and to the plenum chambers 58 and 59. The valve 26 serves to rapidly and continuously pulse the flow of gaseous fluid to the plenum chambers by alternating the flow of gas first to one of the plenum chambers 58 and 59 and then to the other. Again, it has been found that a frequency of between two and 15 cycles per second is optimum for many materials.

Figure 9:
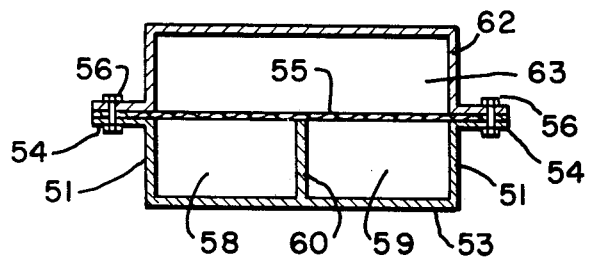
FIG. 9 is a sectional view of closed-top conveyor in accordance with the present invention.

FIG. 9 illustrates a "closed-topped" conveyor which embodies the present invention. The concept of a closed-topped fluidizing gravity conveyor is per se well know. This conveyor includes a cover member 62 over the gas permeable member 55 to define a material chamber 63 above the gas permeable member 55. The material chamber 63 serves to confine material being conveyed and thereby reduce dusting problems. The operation of the conveyor of FIG. 9 is the same as that of FIGS. 6, 7 and 8.

Figure 10:
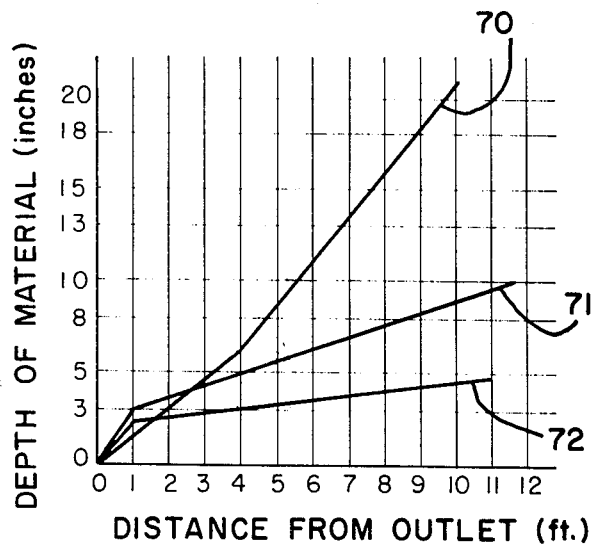
FIG. 10 is a graph illustrating the advantages of the present invention.

By employing the pulsing of the fluidizing air, the angle A at which the conveyor of FIGS. 6, 7, 8 and 9 must be placed in order to properly convey material along the surface of gas permeable member 55 can be substantially reduced and approach a horizontal position. Referring to FIG. 10, the advantages of the present invention will be seen. With a conveyor section positioned horizontally, the depth of material at various points spaced from the outlet was measured with the prior art and with the present invention. The line 70 represents the depth of material when fluidizing air is continuously supplied to the plenum chamber of a conveyor section. The line 71 represents the depth of material as compared to distance from the material outlet when the air to the plenum chamber is pulsed at a rate of 5 to 6 cycles per minute as disclosed in U.S. Pat. No. 3,569,888. The line 72 represents the depth of material when the air is cycled at a frequency of between 2 and 15 cycles per second. Looking at the slope of the residue as shown by line 72 between 1 foot and 10 feet, it can be seen that conveyor section can be placed almost horizontal and still achieve substantial conveying.

The present invention was compared to certain prior practices in tests conducted on a fluidizing gravity conveyor with a raw feed material used to make cement clinker. The conveyor was set on an 8° slope and an air flow of 80 SCFM was used.

The plenum chamber of the conveyor was divided transverse to the length of the conveyor so that the upper half had one plenum and the lower half a second plenum. Material was placed in the conveyor and the initial test was run without cycling or pulsing the air, i.e. a steady air supply to both plenums was used. When the test started, no material was discharged from the conveyor. This indicates that the material is difficult to fluidize and therefore difficult to convey on a conventional fluidizing gravity conveyor. By altering the slope of the conveyor and the air supply to the conveyor, the material was disturbed enough to achieve fluidization so that on repeated testing at the 8° slope, the material would move down the conveyor. Once the material was fluidized, the material would flow down the conveyor at a rate of about 280 pounds per minute.

The next series of tests using the same apparatus and material employed a valve as shown in the present application at 26 to cycle or pulse the air between the upper and lower plenum chambers. Initially, a very slow cycling (4 cycles per minute) was used. When the upper half of the conveyor was activated (air supplied to the upper plenum chamber) material would flow over the upper half of the conveyor, but as the material approached the lower half of the conveyor, the material would deaerate and stop flowing. When air was cycled to the lower plenum chamber, material in the lower end of the conveyor was fluidized and was conveyed and discharged from the conveyor. However, material on the upper half of the conveyor did not move into the lower half of the conveyor vacated by the material discharged from the lower half. Although the pulsing did serve to achieve easy fluidization of a difficult to fluidize material in the manner described in U.S. Pat. No. 3,469,888 previously referenced, the total capacity of the conveyors was not increased as compared to a conventional fluidizing gravity conveyor handling fluidized material, but rather the total capacity decreased. The actual capacity was 30 pounds per cycle or 120 pounds per minute. Below 4 cycles per minute, it is believed that the same pounds per cycle would prevail.

As the frequency of cycling or pulsing was increased by shortening the length of conduit 32 as shown in FIG. 5, the full capacity of 30 pounds per cycle decreased but a more steady discharge of material was obtained. In order to achieve the same capacity as was achieved with a steady air supply, once the material was fluidized, it was necessary to cycle or pulse at a frequency in excess of 40 cycles per minute.

As the frequency of the pulsing was increased above 40 cycles per minute, the total capacity of the conveyor continually increased and capacities in excess of 400 pounds per minute were achieved with pulsing at a frequency of 3000 cycles per minute (50 cycles per second). During the high frequency cycling, the material in the non-aerated section of the conveyor tended to remain fluidized. Unlike the operation during slow cycling, when air was supplied to the lower plenum fluidizing material in that part of the conveyor, material from the upper part of the conveyor flowed into the space vacated by material discharged from the lower part of the conveyor. Switching the air supply to the upper plenum did not result in a stopping of material discharge from the lower section. Thus, a generally steady discharge of material from the conveyor was achieved.

Since air is supplied to only one half of the total conveyor at any given point in time, the total air supplied to the conveyor is half what it would be for a conventional fluidizing gravity conveyor.

It is believed that the present conveyor operates on a principle of mass flow. A fluidized conveyor alone requires gravity to achieve conveying. It is believed that the pulsing of the present invention produces sufficient vibration to substantially eliminate the gravity requirement of the standard fluidized gravity conveyor except where complete clean-out is required. Also with the present invention the volume of air required to transport material on the conveyor is halved. The size of the plenum chambers 58 and 59 is half that of a conventional fluidizing gravity conveyor. Because only one plenum receives air at a time, only half the total air is required. The same is true with the aeration units 10 of FIGS. 1 to 4. The total air required to aerate the bottom of vessel 1 is reduced.

If desired, the conveyor section of FIGS. 6 to 8 could be used in vessel 1. If this were done, a single conveyor 50 could be placed in the bottom of the vessel. Also if desired, a single conveyor of the design of unit 10 could be used in vessel 1 with the air pulsed between the conveyor and atmosphere. Such an arrangement would not take advantage of the air savings achieved by the present invention.

With some uses, it may be desirable to place the aeration units in the vessel 1 on a slight slope from the end of the vessel toward the outlet and use an outlet sump and bottom discharge. This would insure an even more thorough clean-out, but it is not believed necessary as the residue with the system shown in FIG. 1 is so slight as to be unimportant.

Thus, with the present invention, several advantages are achieved: (1) deaerated or bridging material will be virtually immediately fluidized due to the oscillation of the air supply; (2) high frequency oscillation results in greatly increased capacity on a given fluidizing gravity conveyor; (b 3) the slope of the aeration unit in a vessel can be substantially reduced or eliminated to thereby increase the capacity of the vessel; and (4) the total amount of air required can be reduced.

From the foregoing it is evident that the objects of the present invention have been carried out. A conveyor has been provided which will permit a substantial reduction in the slope of the conveyor to achieve conveying of bulk materials. A storage and discharge vessel has been provided which will substantially increase the amount of material which can be contained within a conventional volume vessel while still achieving substantially complete clean-out.

It is intended that the foregoing be a description of the preferred embodiment of the invention and that the invention be limited solely by that which is within the scope of the appended claims.

I claim:

1. Apparatus for transporting solid bulk material comprising;
    channel means defined by gas impervious sidewalls, endwalls and a bottom and a substantially open top;
    a flexible fabric gas permeable member secured to and closing the top of said channel means for supporting solid bulk material to be transported;
    wall means mounted in said channel means parallel to said sidewalls extending substantially from said bottom to said gas permeable member and dividing said channel means into a pair of contiguous plenum chambers;
    means for supplying gaseous fluid at superatmospheric pressure to said channel means for passage through said gas permeable member for aerating the material supported by said gas permeable member;
    means for rapidly and continuously alternating the supply of gaseous fluid first to one of said plenum chambers then to the other of said plenum chambers whereby a pulse of gaseous fluid is transmitted through said gas permeable member to the material supported on the gas permeable member and the material is vibrated and aerated to produce a mass flow of material along said gas permeable member;
    said means for alternating the supply of gaseous fluid includes a diverting valve for rapidly and continuously alternating the supply of substantially all of the gaseous fluid supplied first to one of said plenum chambers and then to the other of said plenum chambers at a frequency of at least about one cycle per second.

2. Apparatus for transporting solid bulk material according to claim 1 wherein said diverting valve includes a fluid control chamber having a gaseous fluid supply connection, a pair of gaseous fluid delivery connections each connected to one of said plenum chambers and a pair of control ports; and conduit means connecting said control ports externally of said fluid control chamber.

3. Apparatus for receiving, storing and discharging solid bulk material comprising;
    an elongated cylindrical vessel including an elongated cylindrical member and end walls closing the cylindrical member, and having an inlet and an outlet for bulk material;
    a pair of aeration units, each positioned in the bottom of said vessel immediately adjacent to the cylindrical member and to each other for substantially the entire length of said vessel and together forming a V shape as viewed from the end walls for substantially the entire length of said vessel;
    each aeration unit including means defining an elongated open topped plenum chamber and gas permeable means secured to and closing the top of said means defining an elongated open topped plenum chamber; and
    means for supplying gaseous fluid under pressure to said aeration units for passage through the gas permeable members for aerating bulk material in said vessel;
    said means for supplying gaseous fluid including a diverting valve for rapidly and continuously pulsing the supply of gaseous fluid by alternating the supply of gaseous fluid first to one of said aeration units and then to the other of said aeration units at a frequency of at least about one cycle per second for vibrating the bulk material in said vessel whereby the aeration and vibration of the bulk material transports the bulk material toward said outlet.

4. Apparatus for receiving, storing and discharging solid bulk material according to claim 3 wherein said outlet includes a conduit having its inlet adjacent the aeration units and extending out of said vessel and further comprising valve means operatively associated with said conduit for controlling the discharge of material from said vessel.

5. Apparatus for receiving, storing and discharging solid bulk materials according to claim 4 wherein said diverting valve includes a fluid control chamber having a gaseous fluid supply connection connected thereto, a pair of gaseous fluid delivery connections each connected to one of said aeration units and a pair of control ports; and conduit means connecting said control ports externally of said fluid control chamber.

* * * * *